US005737215A

United States Patent [19]

Schricker et al.

[11] Patent Number: 5,737,215

[45] Date of Patent: Apr. 7, 1998

[54] METHOD AND APPARATUS FOR COMPARING MACHINES IN FLEET

[75] Inventors: David R. Schricker, Dunlap; Jagannathan Sarangapani; David G. Young, both of Peoria; Satish M. Shetty, East Peoria, all of Ill.

[73] Assignee: Caterpillar Inc., Peoria, Ill.

[21] Appl. No.: 573,214

[22] Filed: Dec. 13, 1995

[51] Int. Cl.[6] .......... G06F 19/00

[52] U.S. Cl. .......... 364/149; 364/424.04

[58] Field of Search .......... 364/424.04, 427, 364/424.034, 424.035, 424.036, 424.037, 424.038, 149–151, 156, 167.01; 246/169; 379/40; 395/911–915, 207–210

[56] References Cited

U.S. PATENT DOCUMENTS

| | | | |
|---|---|---|---|
| 3,882,305 | 5/1975 | Johnstone | 235/151.11 |
| 4,215,412 | 7/1980 | Bernier et al. | 364/551 |
| 4,258,421 | 3/1981 | Juhasz et al. | 364/424.04 |
| 4,773,011 | 9/1988 | VanHoose | 364/424.035 |
| 4,943,919 | 7/1990 | Aslin et al. | 364/424.03 |
| 5,111,402 | 5/1992 | Brooks et al. | 364/424.04 |
| 5,123,017 | 6/1992 | Simpkins et al. | 371/15.1 |
| 5,185,700 | 2/1993 | Bezos et al. | 364/424.04 |
| 5,200,987 | 4/1993 | Gray | 379/40 |
| 5,210,704 | 5/1993 | Husseiny | 364/551.01 |
| 5,265,832 | 11/1993 | Wesling et al. | 246/169 |
| 5,327,347 | 7/1994 | Hagenbuch | 364/424.04 X |
| 5,361,059 | 11/1994 | Hoffman et al. | 340/438 |
| 5,377,112 | 12/1994 | Brown, Jr. et al. | 364/431.12 |
| 5,445,347 | 8/1995 | Ng | 246/169 |
| 5,566,091 | 10/1996 | Schricker et al. | 364/551.01 |

*Primary Examiner*—Joseph Ruggiero

*Attorney, Agent, or Firm*—David M. Masterson

[57] ABSTRACT

An apparatus for comparing one machine in a fleet of machines is provided. The apparatus senses a plurality of characteristics of each machine in the fleet and responsively determines a set of fleet data. The apparatus further determines a set of reference machine data as a function of the fleet data, compares the data for the machine with the reference machine data, and responsively produces a deviation signal.

5 Claims, 6 Drawing Sheets

METHOD AND APPARATUS FOR COMPARING MACHINES IN FLEET

TECHNICAL FIELD

The present invention relates generally to a machine comparing system and more particularly to a system for selectively processing operation parameter data to provide data indicative of machine performance.

BACKGROUND OF THE INVENTION

For service and diagnostic purposes, machines are equipped with sensors for measuring operating parameters such as engine RPM, oil pressure, water temperature, boost pressure, oil contamination, electric motor current, hydraulic pressure, system voltage, exhaust manifold temperature and the like. In some cases, storage devices are provided to compile a database for later evaluation of machine performance and to aid in diagnosis. Service personnel examine the accrued data to determine the cause(s) of any failure or to aid in diagnosis. Similarly, service personnel can evaluate the stored data to predict future failures and to correct any problems before an actual failure occurs. Such diagnosis and failure prediction are particularly pertinent to on-highway trucks and large work machines such as off-highway trucks, hydraulic excavators, track-type tractors, wheel loaders, and the like. These machines represent large capital investments and are capable of substantial productivity when operating properly. It is therefore important to fix or replace degraded components and to predict failures so minor problems can be repaired before they lead to catastrophic failures, and so servicing can be scheduled during periods in which productivity will be least affected.

Systems in the past often acquire and store data from the machine sensors during different machine operating conditions. For example, some data is acquired while the engine is idling while other data is acquired while the engine is under full load. This poses a problem for service personnel to compare data acquired under such different circumstances and to observe meaningful trends in the sensed parameters.

Diagnosis or prediction of component failure for individual machines operating in a fleet of similar machines presents a number of problems to service personnel or fleet managers responsible for efficiently maintaining a fleet and scheduling repairs or replacements.

Additionally, monitoring of the machine data can be useful in productivity analysis between machines in a fleet and/or between fleets operating under the same enterprise.

However, fluctuations in component data or trends may be due to operating conditions rather than component degradation or failure. Therefore monitoring of the data on each individual machine may not always be helpful. The effects of operating conditions on component operating parameters can be more pronounced where the machines are operating over a wide variety of conditions, for example, under day or night or seasonal temperature differences, unusual loading conditions at particular locations on a work site or when performing a particular task.

The present invention is aimed at one or more of the problems as discussed above.

DISCLOSURE OF THE INVENTION

In one aspect of the present invention an apparatus for comparing one machine in a fleet of machines, is provided. The apparatus senses a plurality of characteristics of each machine in the fleet and responsively determining a set of fleet data. The system further determines a set of reference machine data as a function of the fleet data and data for the machine with the reference machine data and responsively produces a deviation signal.

BEST MODE OF THE PRESENT INVENTION

Figure 1:
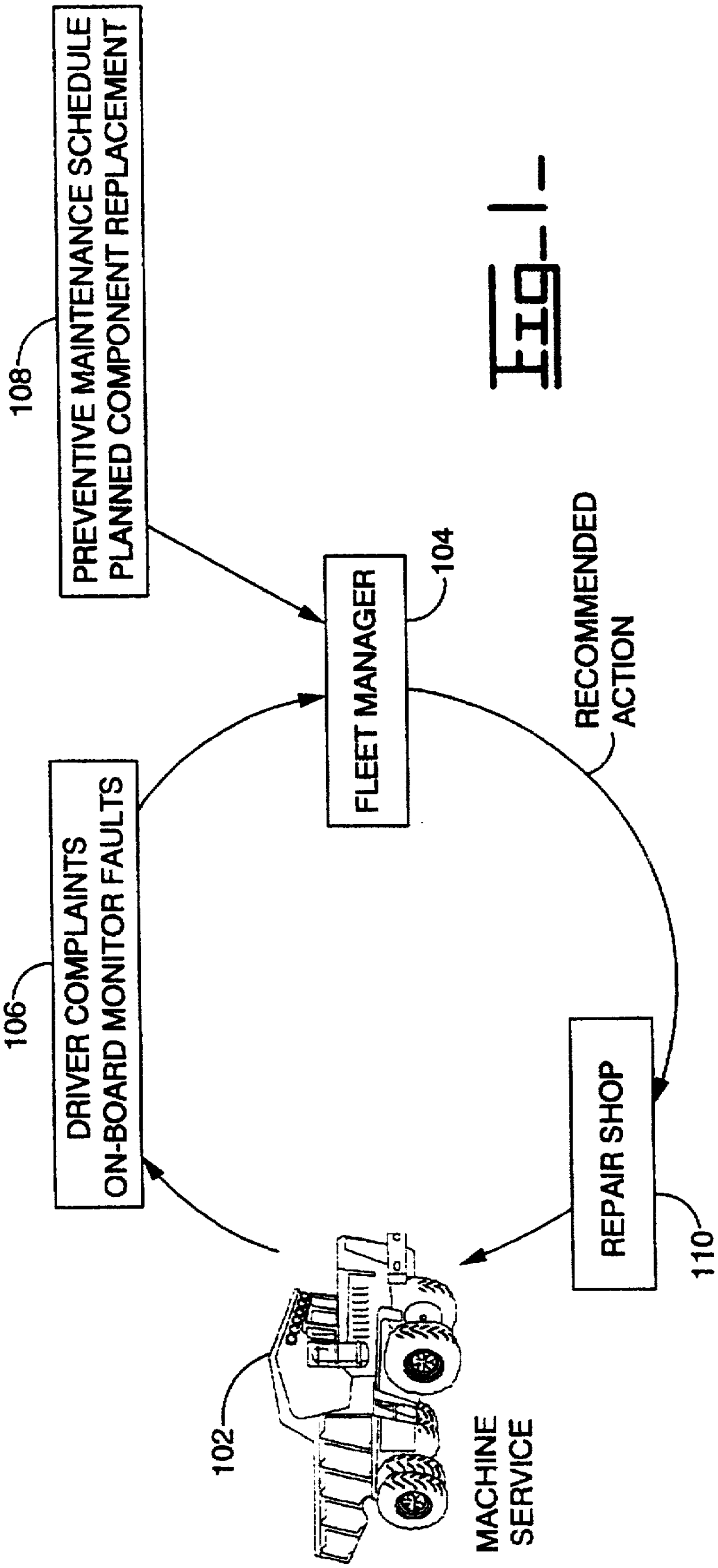
FIG. 1 PRIOR ART
FIG. 1 is an illustration of a service loop for a machine, as is known in the prior art.

FIG. 1 illustrates a prior art method for maintenance and repair of machines in a fleet operating under similar conditions, for example in the same work site or over a common route. The prior art method relies on an individual self-contained service loop for each machine 102 in the fleet. In the illustrated embodiment, the machine 102 is an off-highway truck for hauling earth removed in mining and other construction or earthmoving application.

In the prior art method of FIG. 1, a fleet manager 104 recommends diagnostic testing, maintenance or repairs for the machine 102 based on problems detected by the driver or by onboard monitors 106, or whenever a preventative maintenance or component replacement schedule 108 requires action.

After reviewing any input from the driver or onboard monitors 106 and the maintenance or replacement schedule 108, the fleet manager 104 must intuitively determine what components or systems on the machine 102 are faulty or out of specifications and recommend that the appropriate action be taken at the repair shop 110. This prior art method places the burden of diagnosis/prognosis almost entirely on the fleet manager 104 aided only by the occasional operator complaint or monitor warning and static schedules which may not take into account the fleet's current operating conditions. The prior art method accordingly leaves considerable room for error by the fleet manager, or at a minimum a lack of uniformity in diagnosis/prognosis of the components or systems on the machines in the fleet.

The present invention, on the other hand, takes into account the current operating conditions of the fleet, prepares a reference machine based on the current operating conditions, and compares the current operation status of a machine with the reference machine.

Figure 2:
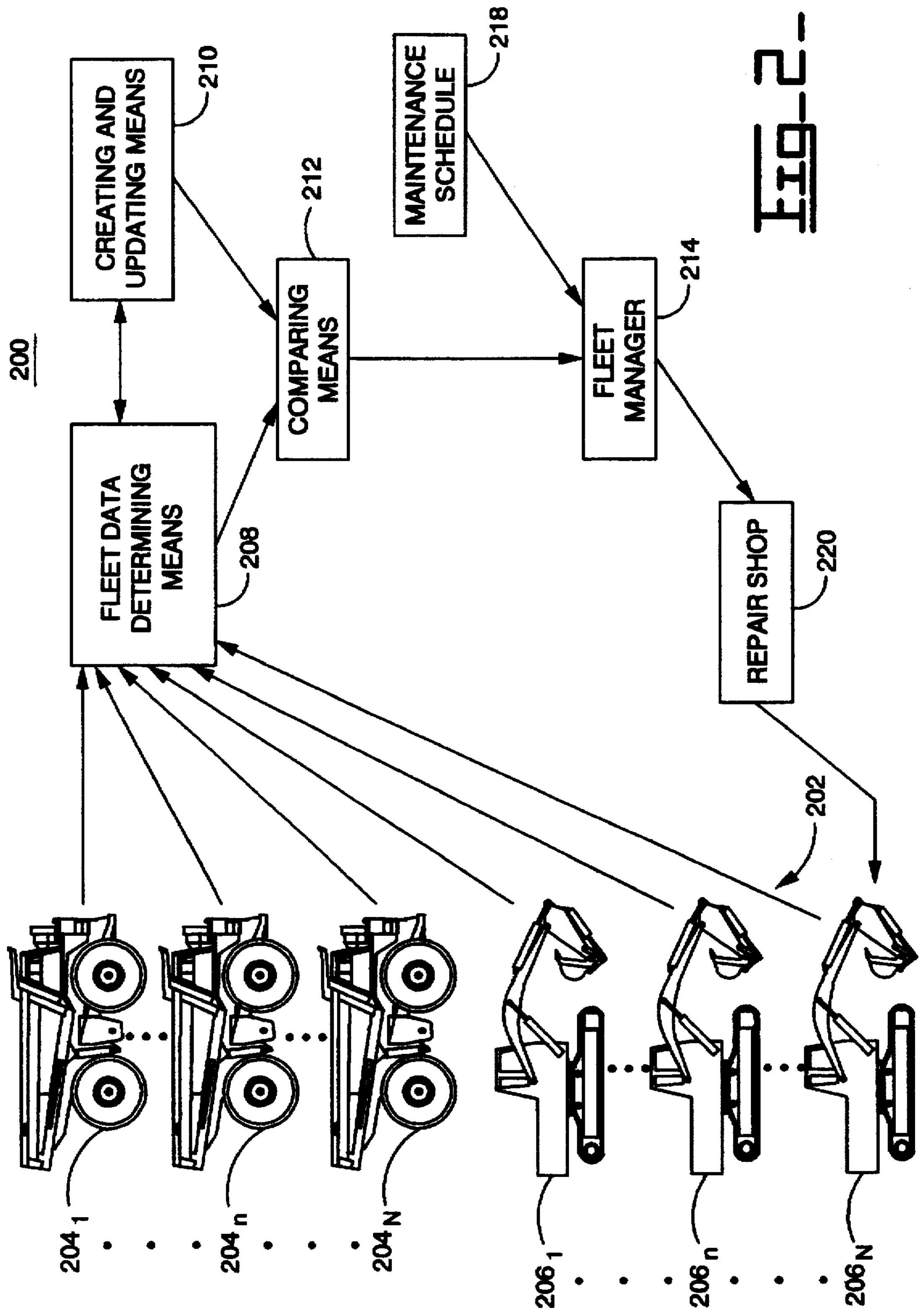
FIG. 2 is an illustration of a service loop for a fleet of machines including a system for comparing one machine to the other machines in the fleet, according to an embodiment of the present invention.

With reference to FIG. 2, the present invention or apparatus 200 is adapted for comparing one machine ($202_n$, $204_n$) in a fleet of machines. The machines are compared for either diagnostics purposes or for productivity analysis. For example, in FIG. 2, the fleet 202 includes a plurality of machines $204_1$–$204_n$ of a first machine type 204 and a plurality of machines $206_1$–$206_N$ a second machine type 206. The first and second types illustrated in FIG. 2 are off-highway trucks and hydraulic excavators, respectively. However, it should be appreciated that the present invention is applicable to fleets having a single machine type and fleets having multiple machine types.

A means 208 senses a plurality of characteristics of each machine $204_1$–$204_N$, $206_1$–$206_N$ and responsively determines a set of fleet data. For example, the set of fleet data may include but is not limited to engine RPM, oil pressure, water temperature, boost pressure, oil contamination, electric motor current, hydraulic pressure, system voltage, exhaust manifold temperature, payload, cycle time, load time, and the like.

In the preferred embodiment, the set of fleet data includes a plurality of parameters of each machine $204_1$–$204_N$, $206_1$–$206_N$. Each of the parameters may be one of three types: a sensed parameter, a deviation parameter, or a calculated parameter. A sensed parameter is a parameter which is sensed directly, i.e. a sensed parameter is a sensed characteristic. A deviation parameter is determined as the difference between two sensed values or between a sensed characteristic and a modeled value of the sensed characteristic. In other words, one of the characteristics is modeled as a function of other characteristics or parameters. The modeled value of the characteristic and the sensed value are compared and the parameter is defined as the difference. A calculated parameter is determined as a function of characteristics or parameters. Generally, machines of a specific machine type determine an identical list of deviation parameters.

In order to be useful for fleet wide diagnosis or prediction of component failure or productivity analysis on the machines $204_1$–$204_N$, $206_1$–$206_N$, the fleet data is preferably accumulated or "trapped" only when the machines $204_1$–$204_N$, $206_1$–$206_N$ are operating under similar conditions, for example, where the machines $204_1$–$204_N$, $206_1$–$206_N$ are performing a similar or identical task, on a similar or identical portion of a work site or transport route, and/or under a similar environmental condition or set of conditions, e.g., temperature. A single parameter or subset of parameters may be trapped under one set of conditions while another single parameter or subset of parameters may be trapped under another set of conditions.

Optionally, a single parameter or subset of parameters may be trapped under different conditions and normalized to the same reference by using a predetermined set of biases. The predetermined biases are determined experimentally.

As discussed below, the trapped data is compared with a stored "normal" fleet data base and any abnormalities are flagged. The normal fleet data base includes a set of reference machine data corresponding to each machine type in the fleet. Additionally, in the preferred embodiment, if the trapped data is within normal operating ranges, it is used to update the fleet data base.

Figure 3:
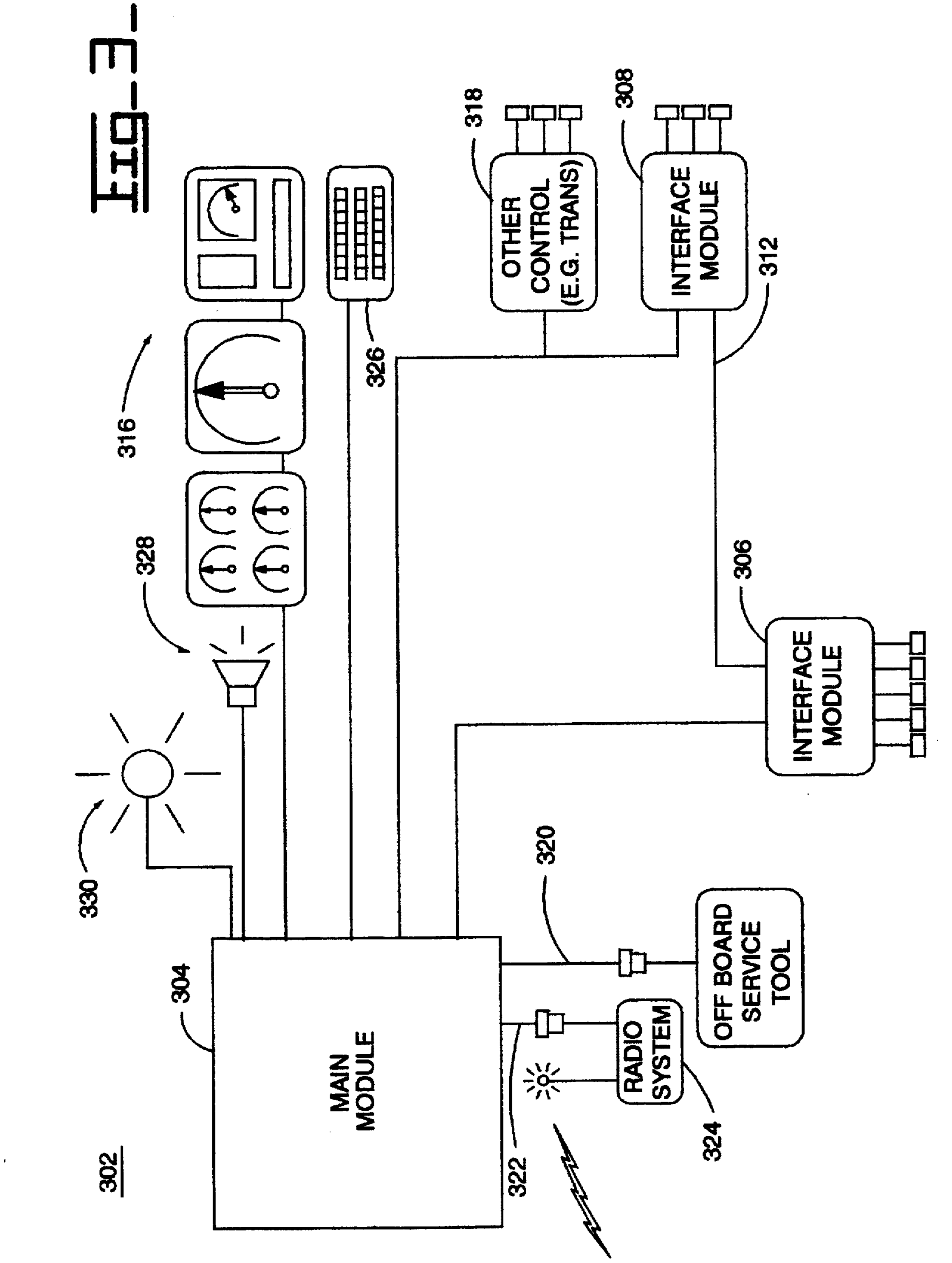
FIG. 3, is an illustration of an information gathering system.

With reference to FIG. 3 in the preferred embodiment, the fleet data determining means 208 includes a machine monitoring system 302 located on each machine. With reference to FIG. 3, the machine monitoring system 302 of one machine will be discussed, however, each machine in the fleet will include a similar system.

The machine monitoring system 302 is a data acquisition, analysis, storage and display system for work machines or vehicles. Employing a complement of onboard and offboard hardware and software, the machine monitoring system 302 will monitor and derive vehicle component information and make such information available to the operator and technical experts in a manner that will improve awareness of vehicle operating conditions and ease diagnosis of fault conditions. Generally the machine monitoring system 302 is a flexible configuration platform which can be modified to meet application specific requirements.

Sensor data is gathered by interface modules that communicate the data by a high speed communication ring 312 to a main module 304 or to a control module 318, where it is manipulated and then stored until downloaded to an offboard control system. In the preferred embodiment, two interface modules 306, 308, each include two transceivers capable of transmitting and receiving data on the communication ring 312. Since the interface modules 306, 308, are connected into the communication ring 312, data can be sent and received by the interface modules 306, 308 in either a clockwise or a counter-clockwise direction. Not only does such an arrangement increase fault tolerance, but diagnosis of a fault is also improved since the system is better able to identify in which portion of the communication ring 312 a fault may exist. The main module 304 is also advantageously connected in the communication ring 312 in a ring configuration and includes two transceivers.

In the preferred embodiment, the other controllers 318 are connected to the communication ring 312 in a bus configuration; however, these controllers 318 may also be designed to incorporate a pair of transceivers such as those included in the interface modules and to be connected to the communication ring 312 in a ring configuration. The actual order of interface modules 306, 308 and other controllers 318 about the communication ring 312 is not critical and is generally selected to economize the overall length of the communication ring 312 and for ease of routing of the wires on the machine. The communication ring 312 is preferably constructed using a standard twisted pair line and communications conforms to SAE data link standards, for example, J1587, but other forms of communication lines may also be used.

Subsets of data are also transmitted from the main module 304 to a display module 316 for presentation to the operator in the form of gages and warning messages. During normal operation gage values are displayed in the operator compartment. During out of spec conditions, alarms and warning/instructional messages are also displayed. A keypad 326 is provided to allow entry of data and operator commands. One or more alarm buzzers or speakers 328 and one or more alarm lights 330 are used to indicate various alarms. A message area is provided and includes a dot matrix LCD to display text messages in the memory resident language and in SI or non SI units. A dedicated back light will be employed for viewing this display in low ambient light conditions. The message area is used to present information regarding the state of the vehicle.

While the main, interface, and display modules 304, 306, 308, 316 comprise the baseline machine monitoring system 302, additional onboard controls 318, such as engine and transmission controls are advantageously integrated into this architecture via the communication ring 312 in order to communicate the additional data being sensed or calculated by these controls and to provide a centralized display and storehouse for all onboard control diagnostics.

Two separate serial communication output lines will be provided by the main module 304 of the machine monitoring system 302. One line 320 intended for routine uploading and downloading of data to a service tool will feed two serial communication ports, one in the operator compartment and one near the base of the machine. The second serial line 322 will feed a separate communications port intended for telemetry system access to allow the machine monitoring system 302 to interface with the radio system 324 in order to transmit vehicle warnings and data offboard and to provide service tool capabilities via telemetry. Thus, the machine monitoring system 302 is allowed to communicate with offboard systems via either a direct, physical communication link or by telemetry. However, other types of microprocessor based systems capable of sending and receiving control signals and other data may be used without deviating from the invention.

Characteristic data and system diagnostics are acquired from sensors and switches distributed about the machine and from other onboard controllers 318 whenever the ignition is on. Characteristic data is categorized as either internal, sensed, communicated, or calculated depending on its source. Internal data is generated and maintained within the confines of the main module 304. Examples of internal data are the time of day and date. Sensed data is directly sampled by sensors connected to the interface modules 306, 308, and include pulse width modulated sensor data, frequency based data and switch data that has been effectively debounced. Sensed data is broadcast on the communication ring 312 for capture by the main module 304 or one or more of the other onboard controllers 318. Communicated data is that data acquired by other onboard controllers 318 and broadcast over the communication ring 312 for capture by the main module 304. Service meter, clutch slip, vehicle load and fuel consumption are examples of calculated characteristics. Calculated data channel values are based on internally acquired, communicated, or calculated data channels.

Referring back to FIG. 2, a means 210 creates and updates a database of statistical norms for the fleet (normal fleet data base) using the fleet data.

A comparing means 212 receives the fleet data from the fleet data determining means 208 and compares the data for each machine in the fleet 202 with the database.

In one embodiment, the database creating and updating means 210 and the comparing means 212 are embodied in a microprocessor based computer system located at a central location.

The fleet data is received at the central location from each machine in the fleet 202. Preferably, the database is updated in real time as new characteristic data is received. This process is described in depth below.

The comparing means 212 produces a deviation signal whenever a parameter of one machine deviates from the value of that parameter stored in the database by a predetermined threshold.

The predetermined threshold can be determined experimentally or statistically. This process is also discussed in depth below.

The deviation signals from the comparing means 212 are received by fleet manager 214. Using deviation signals, any onboard faults recorded by each machine, and a maintenance schedule for each machine, the fleet manager 214 determines a recommended course of action, for example, needed repairs, and relays the recommended action to a repair shop 220 so that the needed repairs can be scheduled.

Figure 4:
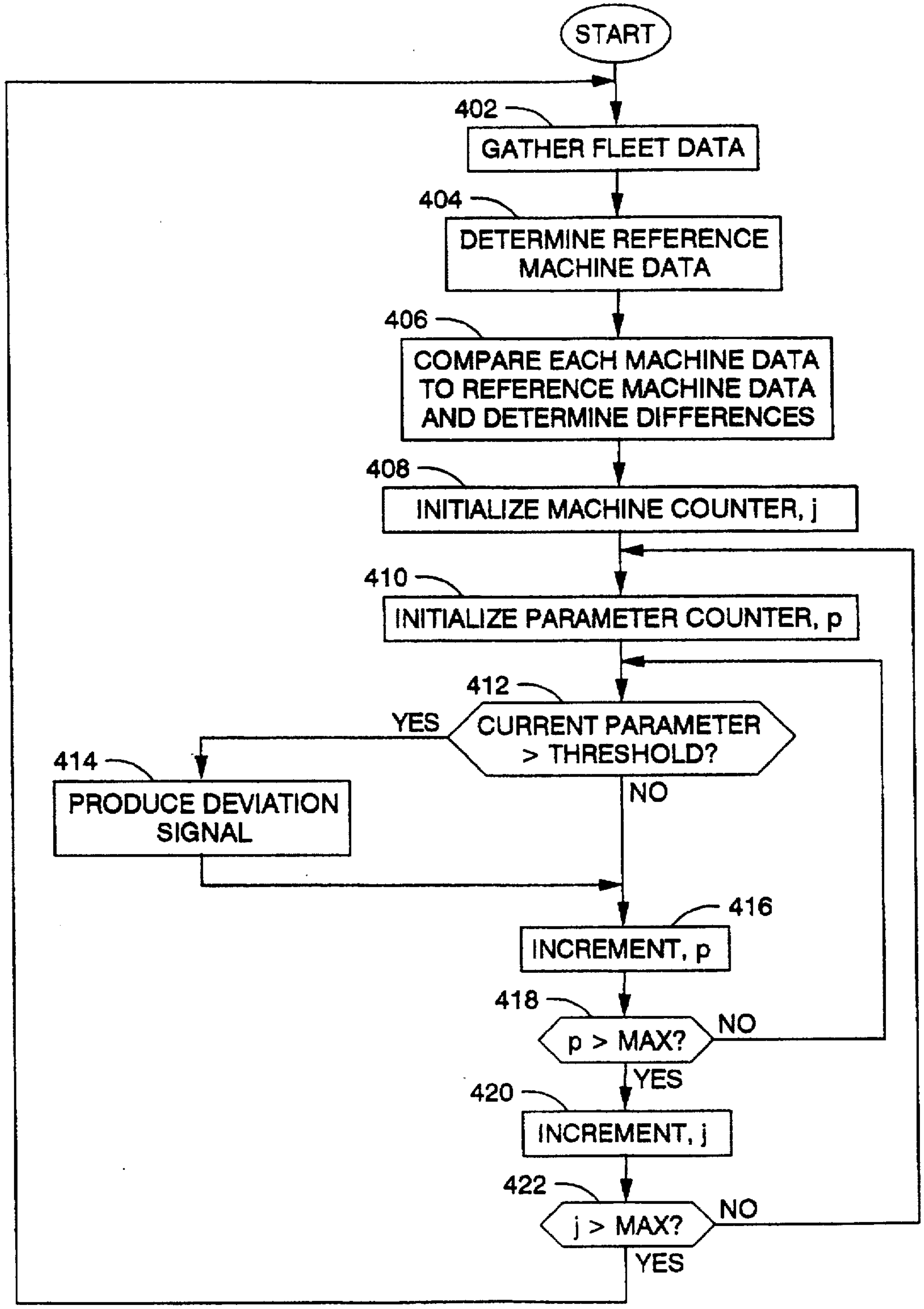
FIG. 4 is a flow diagram illustrating a first portion of the operation of the comparing system of FIG. 2, according to an embodiment of the present invention.
Figure 5:
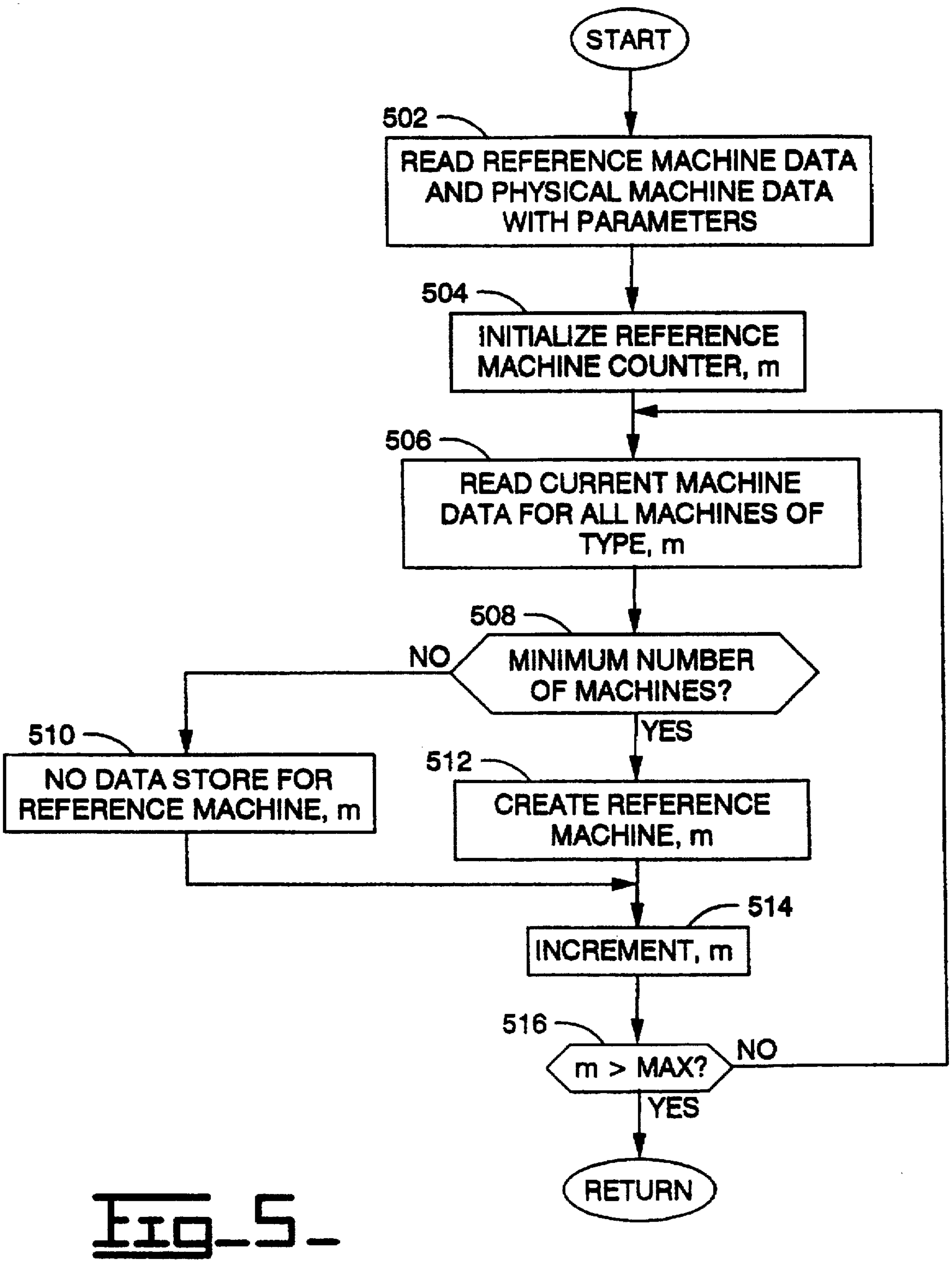
FIG. 5 is a flow diagram illustrating a second portion of the operating of the comparing system of FIG. 2, according to an embodiment of the present invention; and, FIG. 6 is a flow diagram illustrating a third portion of the operating of the comparing system of FIG. 2, according to an embodiment of the present invention.
Figure 6:
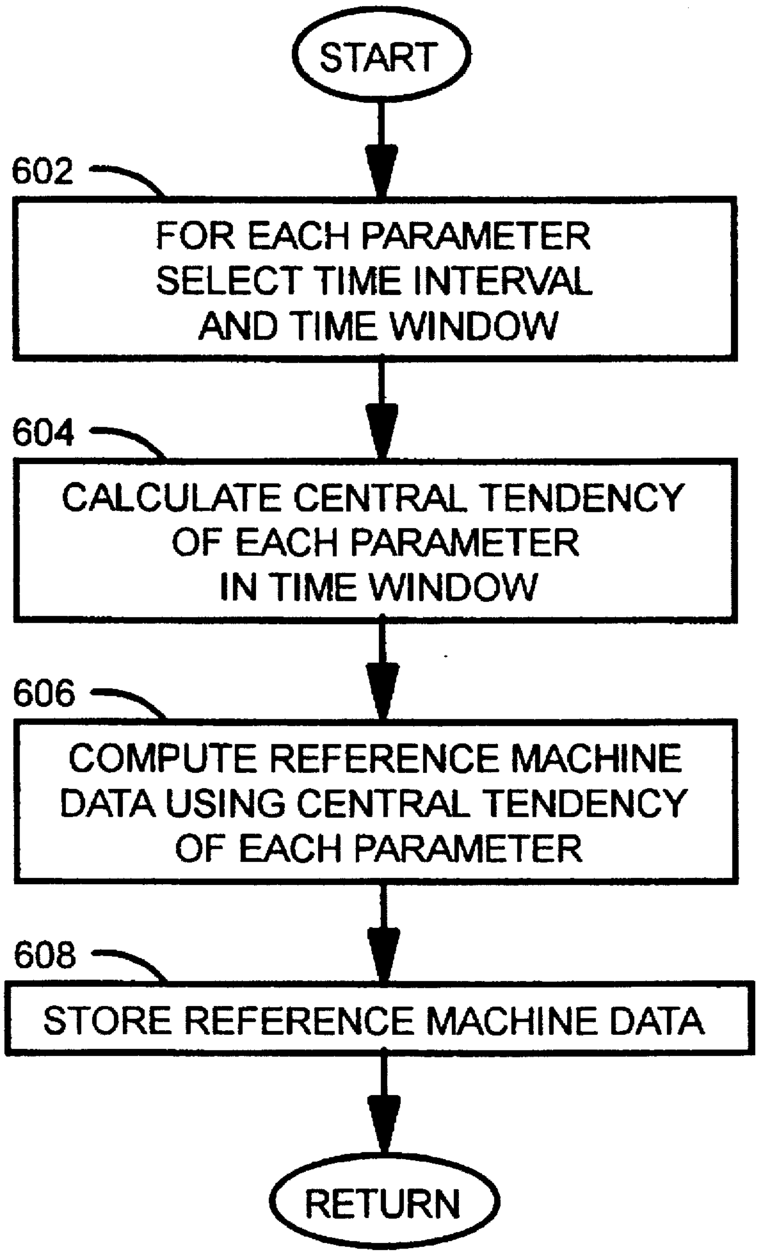

With reference to FIGS. 4–6, the creation and updating of the database and the process of comparing current fleet data with the database will be discussed.

The flow diagram of FIG. 4 illustrates the general operation of the process. In a first control block 402, the current fleet data is gathered. In a second control block 404, the reference machine for each machine type 204,206 is determined. This process is discussed more fully with regard to FIG. 5 and 6 below.

In a third control block 406, the parameters of each machine are compared with the respective reference machine data and a "difference" machine corresponding to each machine in the fleet is determined. The difference machine consists of the difference between the value of each parameter for a particular machine and the corresponding value of the same parameter in the respective reference machine.

In a fourth control block 408, a machine counter, j, is initialized. In a fifth control block 410, a parameter counter, p, is initialized.

In the preferred embodiment, the database includes a predetermined threshold corresponding to each parameter. In a first decision block 412, if the difference stored in current difference machine (j) for the current parameter (p) exceeds the predetermined corresponding parameter, then control proceeds to a sixth control block 414. Otherwise control proceeds to a seventh control block 416.

In the sixth control block 414 a signal indicating the deviation is produced and sent to the fleet manager. Deviation signals may be sent directly to the fleet manager as they occur or the signals may be delivered as a group for each machine, machine type and/or fleet. Control then proceeds to the seventh control block 416.

In the seventh control block 416, the parameter counter, p, is incremented. In a second decision block 418, the parameter counter is compared with a maximum. If p exceeds the maximum, then all parameters for the current machine have been analyzed and control proceeds to an eighth control block 420. Otherwise control returns to the first decision block 412.

In the eighth control block 420, the machine counter, j, is incremented. In a third decision block 422, the machine counter, j, is compared with a maximum. If j exceeds the maximum, then control returns to the first control block 402.

With reference to FIG. 5, the process of determining the reference machine data described in the second control block 404 is now more fully explained. In a ninth control block 502, the data for each reference machine is read. This data may include all the prior data used in creating the old reference machine. In a tenth control block 504, a reference machine counter, m, is initialized.

In an eleventh control block 506, the machine data for all needed machines of the current machine type is read. In a fourth decision block 508, if there is not current data for a predetermined minimum number of machines then control proceeds to a twelfth control block 510 and no data is stored for the current machine type. Otherwise control proceeds to a thirteenth control block 512.

In the thirteenth control block 512, the reference machine for the current machine type is created and/or updated. This process is described more fully with respect to FIG. 6.

In a fourteenth control block 514, the reference machine counter, m, is incremented. In a fifth decision block 516, the reference machine counter, m, is compared with a maximum. If m exceeds the maximum, then all reference machines have been determined and control returns to the main control routine of FIG. 4. Otherwise, control returns to the eleventh control block 506.

With particular reference to FIG. 6, the process of creating each reference machine described in the thirteenth control block 512 is described in more detail.

In the preferred embodiment, the normal fleet data base consists of a series of central tendencies of the trapped data taken over a predetermined time. For example, for a sensed parameter if a sensor is read once a second, a central tendency of the sensed value is calculated for a predetermined time over a given time interval, e.g., the trapped data may be averaged over one minute, ten minutes, or one hour periods or any suitable time period.

For each parameter, the database includes the time interval and time window to be stored.

In one embodiment, the time window is the time period for which data is collected. The time window is divided into of several time intervals of predetermined length.

In another embodiment, the time window is the time period for which data is collected. The time interval refers to the past history of data. As new data is collected, the time interval is updated.

In the preferred embodiment a fleet measure of central tendency of each parameter over the time interval is stored in the database. The central tendency of each parameter may be determined as the mean, median, or trimmed mean.

Thus, in a fifteenth control block 602, data from the trapped data is selected based on the time period and window data stored in the data base.

In a sixteenth control block 604, a valid data point is determined within the time interval and time window constraints for each physical machine. In one embodiment, the valid data point for a given parameter is the mean of all stored data values within the time interval for that parameter. In another embodiment, the valid data point for a given parameter is the last stored data value for that parameter within each time interval.

In a seventeenth control block 606, the central tendency of the valid data points is calculated for each parameter.

In a eighteenth control block 608, a new or updated reference machine is calculated using the new central tendencies. It should be noted that not all reference machine parameters need to be valid to create the reference machine.

In a first embodiment, the value stored in the reference machine for each parameter is the mean of the valid data points for the respective parameter for each machine of each machine type in the fleet. In a second embodiment, the value stored in the reference machine for each parameter is the median of the valid data points for the respective parameter. In a third embodiment, the value stored in the reference machine for each parameter is the trimmed mean of the valid data points for the respective parameter. A trimmed mean is determined by discarding the top X% and lowest X% of the valid data points, where X is a preferred trim level, e.g., 25%. It should be noted that the central tendency of each parameter may be determined using any of the three embodiments.

In an nineteenth control block 610, the reference machine for each machine type is stored in memory and control returns to the main control routine of FIG. 4.

INDUSTRIAL APPLICABILITY

With reference to the drawings and in operation, the present invention provides a method and apparatus for diagnosing one machine 204n, 206n in a fleet 202 of machines.

A means 208 located on each machine determines a plurality of parameters based on sensed characteristics of each machine. The parameters are stored and sent to a central location according to a set of predetermined conditions.

A means 210 creates and updates a database containing a set of reference machine data based on the parameters. Preferably, the database is updated in real time and represents the norm with which future parameters are compared.

A means 212 compares the current parameter or fleet data for each machine with the corresponding reference machine. Any deviations are reported to the fleet manager. The fleet manager by using any other alarms, the reported deviations and by examining the parameter data recommends any required actions to be taken.

Other aspects, objects, and features of the present invention can be obtained from a study of the drawings, disclosure, and the appended claims.

We claim:

1. An apparatus for comparing one machine in a fleet of machines, comprising:

means for sensing a plurality of characteristics of each machine in the fleet and responsively determining a set of fleet data, said set of fleet data includes a plurality of parameters of each machine, each parameter being associated with a time interval and time window, wherein values of said plurality of parameters are stored in a database in response to the associated time interval and time window;

means responsive to said set of fleet data for determining a set of reference machine data; and, means for comparing data for the machine with said reference machine data and responsively producing a deviation signal.

2. An apparatus for comparing one machine in a fleet of machines, comprising:

means for sensing a plurality of characteristics of each machine in the fleet and responsively determining a set of fleet data, said set of fleet data includes a plurality of parameters of each machine;

means responsive to said set of fleet data for determining a set of reference machine data and for modeling at least one characteristic based on other characteristics and comparing a modeled value of said at least one characteristic with an actual value of said at least one characteristic and wherein one parameter is equal to the difference between said modeled and actual values of said at least one characteristic and, means for comparing data for the machine with said reference machine data and responsively producing a deviation signal.

3. An apparatus for comparing one machine in a fleet of machines, comprising:

means for sensing a plurality of characteristics of each machine in the fleet, for determining a first parameter as a function of at least one characteristic, setting a second parameter equal to at least one other characteristic, modeling another characteristic as a function of a set of characteristics, comparing a modeled value with an actual value of said another characteristic, and setting a third parameter, and for creating a database of said first, second, and third parameters;

means responsive to said database for creating a set of reference machine data; and, means for comparing data for the one machine with said set of reference machine data and responsively producing a deviation signal.

4. An apparatus for comparing one machine in a fleet, the fleet includes machines of a first type and machines of a second type, comprising:

means for sensing a plurality of characteristics of each machine in the fleet and responsively determining a set of fleet data, said set of fleet data includes a plurality of parameters of each machine, each parameter being associated with a time interval and time window, wherein values of said plurality of parameters are stored in a database in response to the associated time interval and time window;

means responsive to said set of fleet data for determining first and second sets of reference machine data corresponding to the first and second machine types, respectively; and, means for comparing data for the machine with a respective one of said first and second sets of reference machine data and responsively producing a deviation signal.

5. A method for comparing one machine in a fleet of machines, comprising the steps of:

sensing a plurality of characteristics of each machine in the fleet and responsively determining a set of fleet data, said set of fleet data includes a plurality of parameters of each machine, each parameter being associated with a time interval and time window, wherein values of said plurality of parameters are stored in a database in response to the associated time interval and time window;

determining a set of reference machine data in response to said set of fleet data; and, comparing data for the one machine with said reference machine data and responsively producing a deviation signal.

* * * * *